United States Patent [19]

Samide

[11] 4,067,415

[45] Jan. 10, 1978

[54] LOCKING ARRANGEMENT FOR COUNTERWEIGHT

[75] Inventor: Frank R. Samide, Chardon, Ohio

[73] Assignee: Towmotor Corporation, Mentor, Ohio

[21] Appl. No.: 746,570

[22] Filed: Dec. 1, 1976

[51] Int. Cl.² .............................................. B66F 9/06
[52] U.S. Cl. .................................... 187/9 R; 280/759
[58] Field of Search ........................ 187/9 R, 9 E, 94; 214/142, 731, 127; 280/759; 212/48, 49; 180/68.5; 403/323, 324, 328, 330, 349, 350

[56] References Cited

U.S. PATENT DOCUMENTS

| | | | |
|---|---|---|---|
| 1,310,313 | 7/1919 | Vara | 292/60 |
| 2,086,982 | 7/1937 | McCarter | 292/60 X |
| 2,223,275 | 11/1940 | Valenzuela | 292/60 X |
| 2,925,149 | 2/1960 | Hughson | 187/9 R |
| 2,975,924 | 3/1961 | Kopanski | 214/731 |
| 3,061,034 | 10/1962 | Hoyt | 187/9 R X |
| 3,367,441 | 2/1968 | Schuster et al. | 180/68.5 |
| 3,730,545 | 5/1973 | Allori | 280/759 |
| 3,787,086 | 1/1974 | Cosby | 180/101 X |
| 4,002,256 | 1/1977 | Kroboth | 214/731 |

FOREIGN PATENT DOCUMENTS 10,247 of 1928 Australia ............................... 292/60

Primary Examiner—Evon C. Blunk
Assistant Examiner—James L. Rowland
Attorney, Agent, or Firm—Phillips, Moore, Weissenberger, Lempio & Majestic

[57] ABSTRACT

An improved mounting and locking arrangement useful in a vehicle having load-lifting means at a first portion thereof, and a removable counterweight at a second portion thereof, on an opposite side of the center of gravity of the vehicle from the load-lifting means. The improved arrangement comprises a pin extending generally vertically upwardly from the second portion of the vehicle. The pin fits within a bore which extends generally vertically upwardly into the counterweight. A generally horizontal rod is slidably positioned within a generally horizontal hole in the counterweight. A frame member of the vehicle, is part of the second portion thereof, has a generally horizontal hole therein aligned with the generally horizontal counterweight hole to slidably receive a first end of the rod. Apparatus is also provided for slidably positioning the rod relative to the generally horizontal counterweight and frame member holes.

8 Claims, 5 Drawing Figures

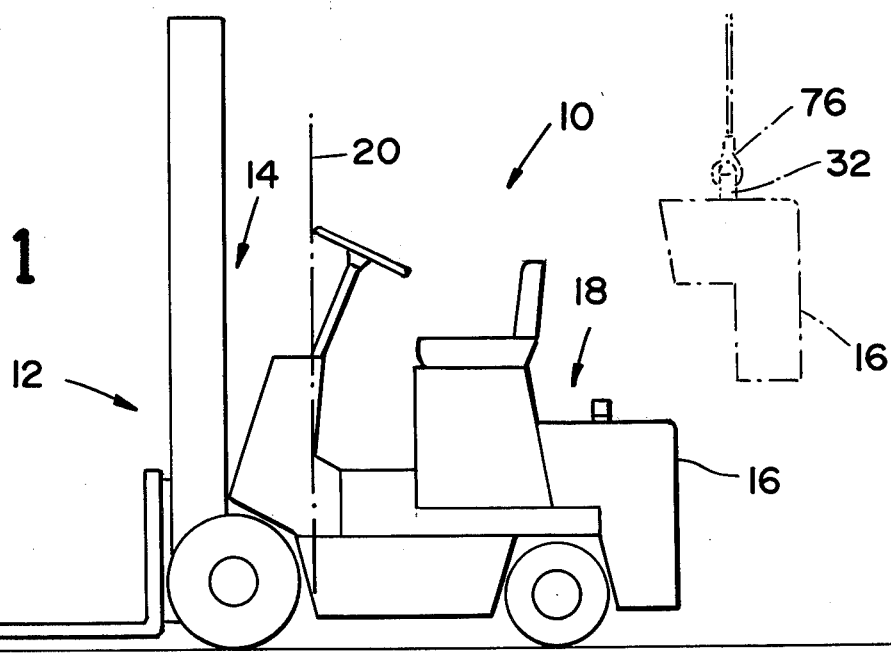
FIG_1
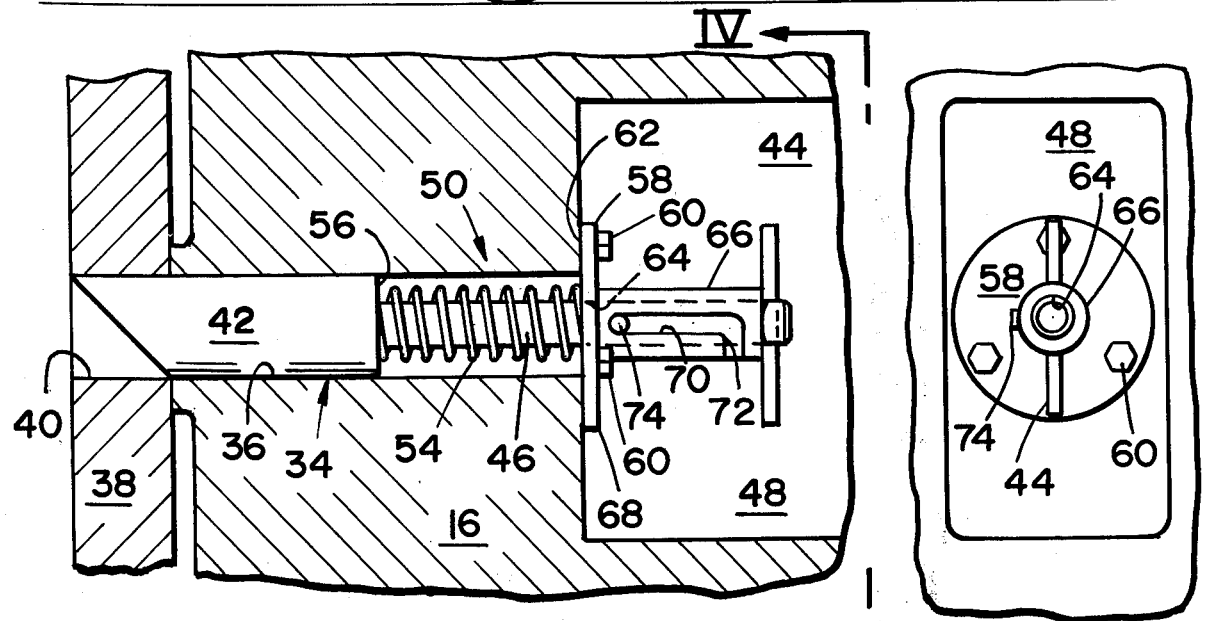
FIG_3
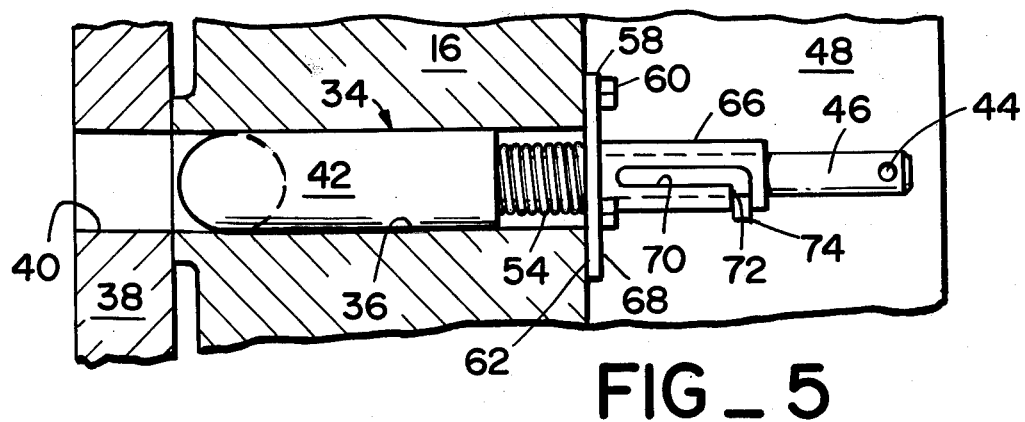
FIG_4
FIG_5

FIG_2
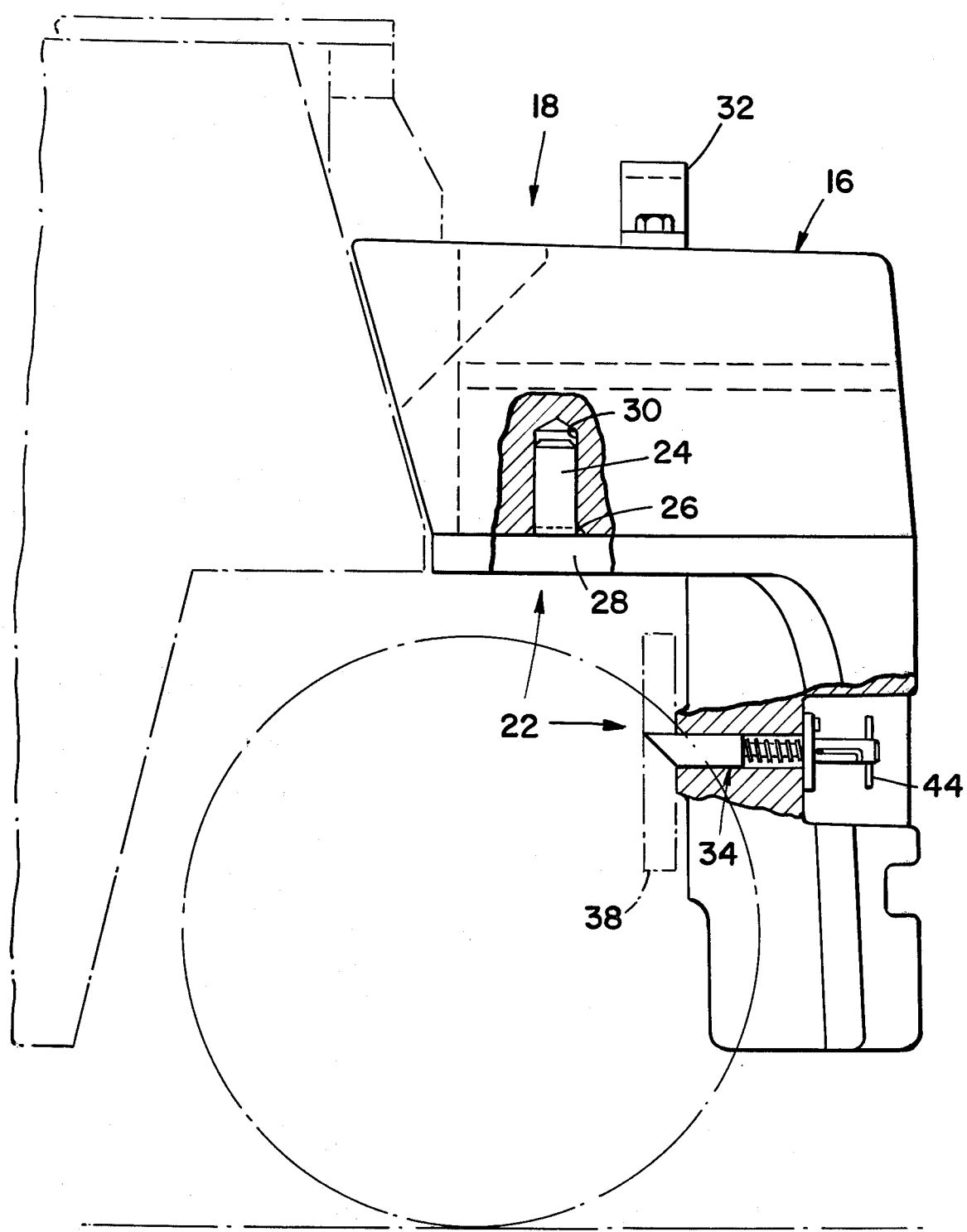

LOCKING ARRANGEMENT FOR COUNTERWEIGHT

BACKGROUND OF THE INVENTION

1. Field of the Invention

The invention is concerned with vehicles having load-lifting means such as forklifts and the like attached thereto. More particularly, the invention is concerned with such vehicles which also includes a removable counterweight on an opposite side of the center of gravity of the vehicle from the load-lifting means. Such vehicles are particularly useful on docks and the like wherein they can be used to move cargo on the docks and then can be lifted into the holds of ships to move cargo therein. In such a situation, the counterweight is generally moved separately from the remainder of the vehicle.

2. Prior Art

Vehicles having load-lifting capacities such as lift trucks are very well known to the prior art. Such trucks are often used with a counterweight removably secured thereto on an opposite side of the center of gravity thereof from the load-lifting means thereof. For example, lift-trucks of this sort are generally used on docks wherein they can be used to move relatively heavy loads because of the presence of the counterweight from one place to another, and thereafter can be lifted into the hold of a ship in two pieces, one piece being the counterweight and the other being the vehicle itself, wherein they can be used to properly position cargo within the hold of the ship. Such lift-trucks are taught for example in each of U.S. Pat. Nos. 3,061,034; 3,367,441 and 3,787,086. In the first of the above-mentioned patents, the counterweight is bolted into place. In the second of the above-listed patents, the counterweight is held in place by hooks, and in the third of the above-mentioned patents, crossbolts are used to secure the counterweight in place.

The counterweight mounting means taught by the above-mentioned patents and elsewhere in the prior art, do not in a single structure allow for the very quick removal of a counterweight from a vehicle, provide secure restraining of the counterweight from lateral motion and at the same time provide secure vertical restraining of the counterweight which is very quickly and easily removed from the lift-truck or the vehicle to which it is attached. The present invention is concerned with an improved mounting and locking arrangement which accomplishes at one and the same time all of the above desirable results and which in some embodiments even further provides certain important features which allow it to be moved about without any possibility of its parts snagging upon any equipment in the area thereof.

SUMMARY OF THE INVENTION

The invention is concerned with an improved mounting and locking arrangement in a vehicle having load-lifting means at a first portion thereof, and a removable counterweight at a second portion thereof on an opposite side of the center of gravity of the vehicle from the load lifting means. The improved arrangement comprises pin means extending generally vertically upwardly from the second portion of the vehicle into a bore which extends generally vertically upwardly into the counterweight for receiving the pin means therein. Generally horizontal rod means are slidably positioned within a generally horizontal hole in the counterweight. A frame member of the vehicle, which is a part of the second portion thereof, has a generally horizontal hole therein aligned with the generally horizontal counterweight hole to slidably receive the first end of the rod means. Also, means are provided for slidably positioning the rod means relative to the generally horizontal counterweight and frame member holes.

BRIEF DESCRIPTION OF THE DRAWINGS

The invention will be better understood by reference to the figures of the drawings wherein like numbers denote like parts throughout and wherein:

FIG. 1 illustrates in side view, a vehicle in accordance with the present invention, and a counterweight both on the vehicle and being lifted therefrom;

FIG. 2 illustrates in blown-up view, partially in section, the improved mounting and locking arrangement of the present invention;

FIG. 3 illustrates a detail in the improved mounting and locking arrangements of the present invention;

FIG. 4 illustrates a view taken along IV—IV of FIG. 3; and

FIG. 5 illustrates a view similar to FIG. 3 wherein the improved mounting and locking arrangement is in position for removal of the counterweight from the vehicle.

DETAILED DESCRIPTION OF THE PREFERRED EMBODIMENT

Adverting first to FIG. 1, there is illustrated a vehicle 10 equipped in accordance with the present invention. The vehicle 10 has load-lifting means, in the embodiment illustrated a mast and forklift assembly 12 at a first portion 14 of the vehicle 10 and a removable counterweight 16 at a second portion 18 of the vehicle 10, which second portion 18 is on an opposite side of the center of gravity of the vehicle 10, which center of gravity is schematically illustrated by a line 20.

Referring now to FIG. 2 of the drawings, there is illustrated therein an improved mounting and locking arrangement 22 in accordance with the present invention. The arrangement 22, as will be seen from FIG. 2, includes pin means or more particularly a pin 24 which extends generally vertically upwardly from the second portion 18 of the vehicle 10. A first end 26 of the pin 24 is secured to a first frame member 28 of vehicle 10.

The counterweight 16 includes bore means in the embodiment illustrated a bore 30, which extends generally vertically upwardly into the counterweight 16 and serves for receiving the pin 24. It is clear that with the pin 24 in the bore 30, generally in sliding fit, lateral motion of the counterweight 16 with respect to the vehicle 10 is completely prevented. It is also clear that the counterweight 16 can be lifted directly upwardly through use of an eye 32 as illustrated in FIG. 1.

Adverting again to FIG. 2 and also to FIGS. 3–5, it will be seen that generally horizontal rod means, in the embodiment illustrated a rod 34 is slidably positioned within a generally horizontal hole 36 in the counterweight 16. A second frame member 38, of the vehicle 10, which second frame 38 is a part of the second portion 18 of the vehicle 10 is provided with a generally horizontal hole 40 therein, which is generally aligned coaxially with the generally horizontal counterweight hole 36. The generally horizontal hole 40 in the second frame member 38 is aligned to slidably receive a first end 42 of the rod 34. Means are generally provided for slidably positioning the rod 34 relative to the generally horizontal counterweight hole 36 and the generally horizontal frame member hole 40. In the embodiment illustrated, the slidable positioning means comprises a handle 44 which extends latitudinally from a second end 46 of the rod 34. The handle 44 which generally extends latitudinally from the second end 46 of the rod 34 also serves the purpose of allowing a pulling force to be exerted upon the rod 34 to pull it into the position shown in FIG. 5. The handle 44 also provides means for rotating the rod 34 for a purpose which will become apparent in the following. The handle 44 is generally included within an open cavity 48 in the counterweight 16 whereby when the counterweight 16 is being lifted, no parts are projecting therefrom to catch upon adjacent equipment, materials or personnel.

Means are preferably provided for holding the rod 34 in a first position 50 as illustrated in FIG. 3 with the first end 42 thereof in the generally horizontal hole 40 in the second frame 38. Means are provided for holding the rod 34 in a second position 52 as illustrated in FIG. 5 with the first end 42 thereof removed from the generally horizontal hole 40 in the second frame member 38. The means for holding the rod 34 in the first position 50 comprises spring biasing means or in the embodiments illustrated, a spring 54 which biases the first end 42 of the rod 34 and thereby the rod 34 in its entirety away from the counterweight 16 and towards the second frame member 38. More particularly, the spring 54 acts between a shoulder 56 on the rod 34, which shoulder 56 marks the boundary between the first end 42 and the second end 46 of the rod 34 and a flange 58 which is attached to and forms a part of the counterweight 16 via bolt means 60. As is clear, the second end 46 of the rod 34 has a reduced lateral size or diameter relative to the first end thereof. As is also clear by reference most particularly to FIG. 3, the spring 54 acts between the shoulder 56 on the rod 34 and a first side 62 of the flange 58. It is further clear that the first side 62 of the flange 58 is affixed to the counterweight 16 over the generally horizontal counterweight hole 36.

Also, as is clear by reference to any of FIGS. 3-5, the flange 58 has a central hole 64 therethrough through which the reduced sized second end 46 of the rod 34 passes. The flange 58 has a sleeve 66 sized to allow passage of the second end 46 of the rod 34 slidably therein. The sleeve 66 extends from a second side 68 of the flange 58, and is in alignment with the central hole 64 in the flange 58. The sleeve 66 has an axially parallel extending slot 70 therethrough. The sleeve 66 also includes a radially extending slot 72 which extends from an end of the axially parallel extending slot 70 and is useful in a manner which will soon become apparent.

Extending from the second end 46 of the rod 34, is a projection 74 which slidably fits in the axially parallel extending slot 70 and on axial rotation of the rod 34, slidingly fits in the radially extending slot 72. In this manner, it is clear that the means for holding the rod 34 in its second position 52 comprises detent means supported by the counterweight, more particularly the radially extending slot 72 in the embodiment illustrated and detent engaging means comprising the latitudinal projection 74 from the second end 46 of the rod 34.

OPERATION

In operation, a counterweight 16 would sit upon a vehicle 10 in the manner illustrated in FIGS. 1 and 2 with the pin 24 held in the bore 30 whereby latitudinal motion of the counterweight 16 would be completely prevented. At the same time, and as is clearly illustrated in FIG. 2, the first end 42 of the rod 34 would be held within the second frame member 38 thereby preventing vertical motion of the counterweight 16. By reference particularly to FIG. 3, it will be seen that the second end 42 of the rod 34 will be held within second frame member 38 by the action of the spring 54 acting between the shoulder 56 and the first side 62 of the flange 58. In this position, the projection 74 will be against an end of the slot 70 closest to the second frame member 38.

If one wishes to remove the counterweight 16 from the vehicle 10, one simply grasps the handle 44 with, for example, the middle and index fingers and pull outwardly thereupon thus pulling the entire rod 34 outwardly away from the second frame member 38 until the projection 74 is opposite the radially extending slot 72. Next, the handle 44 is rotated ninety or so degrees whereby the projection 74 is moved into the radially extending slot 72 and thereby the rod 34 is moved into its second position 52 as illustrated in FIG. 5. In this position, the first end 42 of the rod 34 is completely removed from the hole 40 in the second frame member 38. It should be noted that even in the second position 52, the rod 34 and for that matter the handle 44, is generally held completely within the cavity 48 so that it cannot become in anyway entangled with any adjacent equipment. A lifting hook 76 as seen in FIG. 1, is then engaged with the hook means or eye 32 of the counterweight 16, and the counterweight 16 is lifted generally straight upwardly and off of the pin 24. As soon as the pin 24 has been cleared, the counterweight 16 can be moved sidewardly as shown in FIG. 1.

Attachments of the counterweight 16 to the vehicle 10 occurs in a very quick and straightforward manner. The counterweight 16 is simply lowered on to an appropriate vehicle 10 with the pin 24 lined within the bore 30. The handle 44 is then rotated ninety degrees or so to free the projection 74 from the radially extending slot 72 and to place it in the axially parallel extending slot 70. The spring 54 is then allowed to act between the shoulder 56 and the first side 52 of the flange 58 thus forcing the first end 42 of the rod 34 into the hole 40 in the second frame member 38. The locking and mounting arrangement 22 of the present invention thus provides both quick removal and quick mounting and locking of a counterweight 16 on a vehicle 10. Further, it is quite clear that the locking and mounting arrangement 22 also provides retention against latitudinal movement of the counterweight 16 relative to the vehicle 10 and vertical movement of the counterweight 16 relative to the vehicle 10.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. In a vehicle having load-lifting means at a first portion thereof and a removable counterweight at a second portion thereof on an opposite side of the center of gravity of said vehicle from said load-lifting means, an improved mounting and locking arrangement, comprising:
- pin means extending generally vertically upwardly from said second portion of said vehicle;
- bore means extending generally vertically upwardly into said counterweight for slidably receiving all portions of said pin means therein;
- generally horizontal rod means slidably positioned within a generally horizontal hole in said counterweight;
- a frame member of said vehicle as a part of said second portion thereof having a generally horizontal hole therein aligned with said generally horizontal counterweight hole to slidably receive a first end of said rod means; and
- means for slidably positioning said rod means in and out relative to said generally horizontal counterweight and frame member holes.

2. An arrangement in a vehicle as in claim 1, including:
- means for biasing said rod means in a first position thereof with said first end thereof slidably positioned in said frame member hole; and
- means for holding said rod means against the force of said biasing means in a second position thereof with said first end thereof slidably removed from said frame member hole.

3. In a vehicle having load-lifting means at a first portion thereof and a removable counterweight at a second portion thereof on an opposite side of the center of gravity of said vehicle from said load-lifting means, an improved mounting and locking arrangement, comprising:
- pin means extending generally vertically upwardly from said second portion of said vehicle;
- bore means extending generally vertically upwardly into said counterweight for receiving said pin means therein;
- generally horizontal rod menas slidably positioned within a generally horizontal hole in said counterweight;
- a frame member of said vehicle as a part of said second portion thereof having a generally horizontal hole therein aligned with said generally horizontal counterweight hole to slidably receive a first end of said rod means;
- means for slidably positioning said rod means relative to said generally horizontal counterweight and frame member holes;
- means for holding said rod means in a first position with said first end thereof in said frame member hole, said first position rod means holding means comprising spring biasing means biasing said rod means away from said counterweight and towards said frame member; and
- means for holding said rod means in a second position with said first end thereof removed from said frame member hole, said second position rod means holding means comprising detent means supported by said counterweight and detent engaging means supported by said rod means.

4. An arrangement in a vehicle as in claim 3, wherein said spring biasing means acts between said rod means, said rod means having a second end of a reduced lateral size relative to frist end thereof, and a flange having a first side thereof affixed to said counterweight over said generally horizontal counterweight hole, said flange having a central hole therethrough through which said reduced sized second end of said rod means passes, said flange having a sleeve extending from a second side thereof in alignment with said central hole thereof said sleeve having an axially parallel extending slot therethrough;
- said detent means comprises a radially extending slot communicating with said axially parallel extending slot; and
- said detent engaging means comprises a latitudinal projection from said reduced sized second end of said rod means which slidingly fits in said axially parallel extending slot and on axial rotation of said rod means slidingly fits in said radially extending slot.

5. An arrangement in a vehicle as in claim 4, wherein said slidable positioning means includes handle means extending latitudinally from said second end of said rod means for pulling said rod means into said second position thereof and for rotating said rod means to position said projection in said radially extending slot.

6. An arrangement in a vehicle as in claim 5, including:
- an open cavity in said counterweight which contains said flange, said sleeve and said handle means.

7. An arrangement in a vehicle as in claim 6, wherein said counterweight includes hook means adjacent a top thereof.

8. An arrangement in a vehicle as in claim 7, wherein said vehicle comprises a lift-truck and said load-lifting means comprise a mast assembly of said lift-truck.

* * * * *